(12) United States Patent
Firestone et al.

(10) Patent No.: US 12,634,144 B1
(45) Date of Patent: May 19, 2026

(54) MECHANISM FOR POST-QUANTUM CRYPTOGRAPHIC KEY MATERIAL RESILIENCE

(71) Applicant: SIX3RO, Inc., Alexandria, VA (US)

(72) Inventors: Adam Charles Firestone, Alexandria, VA (US); Hilary Lacey MacMillan, Ashburn, VA (US); Jordan Paul Smilovic, Queens, NY (US)

(73) Assignee: SIX3RO, Inc., Alexandria, VA (US)

( * ) Notice: Subject to any disclaimer, the term of this patent is extended or adjusted under 35 U.S.C. 154(b) by 0 days.

(21) Appl. No.: 19/458,702

(22) Filed: Jan. 24, 2026

Related U.S. Application Data

(60) Provisional application No. 63/915,370, filed on Nov. 11, 2025.

(51) Int. Cl.
H04L 9/32 (2006.01)
H04L 9/08 (2006.01)
(52) U.S. Cl.
CPC .......... H04L 9/3236 (2013.01); H04L 9/0825 (2013.01)

(58) Field of Classification Search
CPC ....... H04L 9/50; H04L 9/3242; H04L 9/3236; H04L 9/0825; H04L 63/12; H04L 63/123; H04L 2209/56
See application file for complete search history.

(56) References Cited

U.S. PATENT DOCUMENTS

| | | | |
|---|---|---|---|
| 2021/0074120 A1 * | 3/2021 | Ragnoni | G07F 17/3241 |
| 2022/0417008 A1 * | 12/2022 | Shrivastava | H04L 9/3263 |
| 2024/0388592 A1 * | 11/2024 | Dash | H04L 9/0631 |

* cited by examiner

*Primary Examiner* — Daniel B Potratz
(74) *Attorney, Agent, or Firm* — Kasha Law LLC; John R. Kasha; Kelly L. Kasha

(57) ABSTRACT

A first request for a public key is sent to one or more key manager devices. The public key is received from the one or more key manager devices. A cryptographic hash algorithm is applied to the public key, producing a first hashed key. The first hashed key is stored in one or more memory devices. A second request for a cryptographic hash of the public key is sent to one or more decentralized information store devices. A second hashed key is received from the one or more decentralized information store devices. The first hashed key is retrieved from the one or more memory devices. The first hashed key and the second hashed key are compared. If the first hashed key matches the second hashed key, the first hashed key is validated. If the keys do not match, a fault is declared, and further activity is ceased.

20 Claims, 7 Drawing Sheets

START

SEND A FIRST REQUEST FOR A PUBLIC KEY TO ONE OR MORE KEY MANAGER DEVICES
510

RECEIVE THE PUBLIC KEY FROM THE ONE OR MORE KEY MANAGER DEVICES
520

APPLY A CRYPTOGRAPHIC HASH ALGORITHM TO THE PUBLIC KEY, PRODUCING A FIRST HASHED KEY
530

STORE THE FIRST HASHED KEY IN ONE OR MORE MEMORY DEVICES
540

SEND A SECOND REQUEST FOR A CRYPTOGRAPHIC HASH OF THE PUBLIC KEY TO ONE OR MORE DECENTRALIZED INFORMATION STORE DEVICES
550

RECEIVE A SECOND HASHED KEY FROM THE ONE OR MORE DECENTRALIZED INFORMATION STORE DEVICES
560

RETRIEVE THE FIRST HASHED KEY FROM THE ONE OR MORE MEMORY DEVICES
570

COMPARE THE FIRST HASHED KEY AND THE SECOND HASHED KEY
580

IF THE FIRST HASHED KEY MATCHES THE SECOND HASHED KEY, VALIDATE THE FIRST HASHED KEY
590

END

MECHANISM FOR POST-QUANTUM CRYPTOGRAPHIC KEY MATERIAL RESILIENCE

RELATED APPLICATIONS

This application claims the benefit of U.S. Provisional Patent Application Ser. No. 63/915,370, filed on Nov. 11, 2025, the content of which is incorporated by reference herein in its entirety.

FIELD OF THE INVENTION

The teachings herein relate to validating cryptographic keys. More particularly, the teachings herein relate to systems and methods for validating a post-quantum cryptography (PQC) public or encapsulation key using decentralized immutable information stores. The systems and methods disclosed herein can be performed in conjunction with one or more processors, controllers, microcontrollers, or computer systems, such as the computer system of FIG. 1.

BACKGROUND

PQC is currently limited, at least, by the inability of current Public Key Infrastructure (PKI) certificate management mechanisms to respond effectively to the threat posed by quantum computing, the vulnerability of existing, centralized certificate authorities (CAs) to sophisticated cyber-attacks, and the vulnerability of immutable information management systems such as distributed ledgers to sophisticated cyber-attacks. In other words, current PKI certificate management standards have not been updated to reflect the requirements of PQC key management.

Immutable data in blockchain and InterPlanetary File System (IPFS) refers to data that, once written or added to the system, cannot be modified or deleted without leaving clear cryptographic evidence of tampering, to which automated responses are possible. In a blockchain, immutability is achieved through cryptographic hashing and consensus: each block contains a hash of the previous block, creating a chain where changing any transaction would require recalculating all subsequent block hashes and convincing the majority of the network to accept the altered chain something that's practically infeasible in a well-secured, decentralized network. In IPFS (InterPlanetary File System), immutability works differently but is equally strong: content is addressed by its cryptographic hash (CID), so the identifier itself is derived from the content. Any change to the file produces a completely different hash/address, meaning you cannot "update" the original content at the same address you can only publish a new version with a new CID. This content-addressing model ensures that any data retrieved using a given CID is guaranteed to be exactly the same as what was originally published, providing strong, tamper-evident immutability without relying on a global consensus mechanism. As used herein definition of immutable is as it applies to blockchain.

Decentralized (or decentralization) in the context of blockchain and IPFS describes a system architecture where no single entity has exclusive control over the network, data storage, validation, or operation-instead, these functions are distributed across a large, diverse, and independent set of participants (nodes) that collectively maintain the system. In a blockchain, decentralization is implemented via a peer-to-peer network in which many distributed nodes each hold a full copy of the transaction ledger, independently verify new transactions, and participate in the consensus mechanism (such as proof-of-work, proof-of-stake, or others) to agree on the canonical chain; this makes it resistant to censorship, single points of failure, or unilateral changes, as no central server or authority can be targeted to shut down, alter, or censor the network. In IPFS, decentralization is realized through a distributed hash table (DHT) and content-addressed networking: files are stored as chunks identified by their cryptographic hashes across any participating node that chooses to pin or cache them, and content is retrieved by asking the network (via the DHT) which nodes currently hold the desired hash there is no central hosting provider or server that can be taken offline, blocked, or forced to remove content, resulting in a highly resilient, fault-tolerant, and censorship-resistant file-sharing and storage layer.

Certificate management systems evolved to ensure the trustworthiness of public key encryption by addressing the challenge of verifying the authenticity and integrity of public keys in a secure and scalable way. In its most fundamental form, public key encryption relies on a pair of keys, a public key for encryption and a private key for decryption. Absent a trusted mechanism to confirm that a public key belongs to the intended entity, attackers can impersonate legitimate parties through man-in-the-middle attacks or key substitution. Certificate management systems, built around PKI, emerged to solve this by introducing digital certificates issued by trusted CAs. These certificates bind a public key to an entity's identity, using cryptographic signatures to ensure authenticity, enabling secure communication protocols like Hypertext Transfer Protocol Secure (HTTPS) and Transport Layer Security (TLS) to function reliably across the internet.

The evolution of these systems was driven by the need for secure digital interactions as the Internet expanded, particularly for e-commerce, online banking, and sensitive data exchange. Currently, standardized PKI frameworks manage the issuance, distribution, renewal, and revocation of certificates, ensuring that only valid, trusted keys are used. By maintaining a chain of trust rooted in CAs, certificate management systems mitigate risks like key compromise or fraudulent certificates, fostering confidence in public key encryption for secure communications and transactions globally.

Quantum computing, however, presents a problem for certificate management systems. Quantum computing poses a threat to classical cryptography by leveraging algorithms that can efficiently factor large numbers and solve discrete logarithm problems, breaking widely used public key encryption schemes such as Rivest-Shamir-Adleman (RSA) and elliptic-curve cryptography (ECC) that rely on these mathematical challenges. Current PKI certificate management systems are not able to respond to this threat because they are built around these vulnerable algorithms, embedding them in digital certificates and trust chains that secure internet communications. Compounding the problem are ongoing Harvest Now, Decrypt Later attacks, which cannot be effectively mitigated without a combination of PQC and post-quantum network security protocols, including certificate management mechanisms, which do not currently exist in a standardized and widely adopted form.

Transitioning to quantum-resistant algorithms requires new cryptographic standards, updated certificate formats, and comprehensive system overhauls, which existing PKI frameworks are not designed to seamlessly adopt without significant redesign and deployment challenges. This translates to an extended timeframe for development and adoption during which ongoing Harvest Now, Decrypt Later attacks are not mitigated.

In addition, while generally well-defended, modern CAs are centralized entities, rendering them vulnerable to cyber-attacks such as phishing and social engineering to steal private keys or credentials, man-in-the-middle attacks to intercept and forge certificates, and distributed denial-of-service (DDoS) attacks to disrupt CA operations. Also, they face risks from insider threats, where compromised employees issue fraudulent certificates, and sophisticated attacks like supply chain attacks or malware infections that target CA infrastructure to manipulate or steal cryptographic materials, undermining the trust in issued certificates.

The cascading effects of a successful attack against a CA can be significant. These can include the issuance of fraudulent digital certificates that enable attackers to impersonate legitimate websites, services, software, or entities, leading to man-in-the-middle attacks, data interception, and theft of sensitive information like credentials or financial data. Compromised CAs can erode trust in secure communication protocols like HTTPS and TLS, disrupt online services, and cause widespread security breaches. Additionally, such attacks may lead to financial losses, reputational damage for affected organizations, and the need for extensive remediation efforts to revoke and replace compromised certificates.

The vulnerabilities inherent to centralized CAs have led to interest in the use of decentralized immutable information stores, such as distributed ledger technology, as a means to ensure the integrity and authenticity of public cryptographic keys. Unfortunately, decentralized immutable information stores come with their own risks. Large-scale public decentralized immutable information stores can come with compute costs that make them prohibitively expensive. Smaller-scale decentralized immutable information stores, especially permissioned or private distributed ledgers, are potentially subject to malicious activities where all copies of the entire ledger are replaced to further an attacker's goals. An immutable information store is, for example, a blockchain implementation of an information store.

It's worth noting that despite their advantages, decentralized immutable information stores have not been broadly adopted as integrity and authenticity engines due to the fact that they are poorly understood and difficult to configure and control. As a result, organizations view them less in terms of their advantages with respect to key validity and integrity verification (i.e., resilience to integrity and authenticity incidents) and more in terms of a competing risk (i.e., complexity and susceptibility to replacement attacks) that outweighs the benefits when compared to conventional PKI architectures that are not resilient with respect to integrity and authenticity incidents.

As a result, there is an unmet need for systems and methods that solve both the PQC key integrity and authenticity problems as well as the trustworthiness and complexity issues associated with decentralized immutable information stores.

BRIEF DESCRIPTION OF THE DRAWINGS

The skilled artisan will understand that the drawings, described below, are for illustration purposes only. The drawings are not intended to limit the scope of the present teachings in any way.

4

Figure 2:
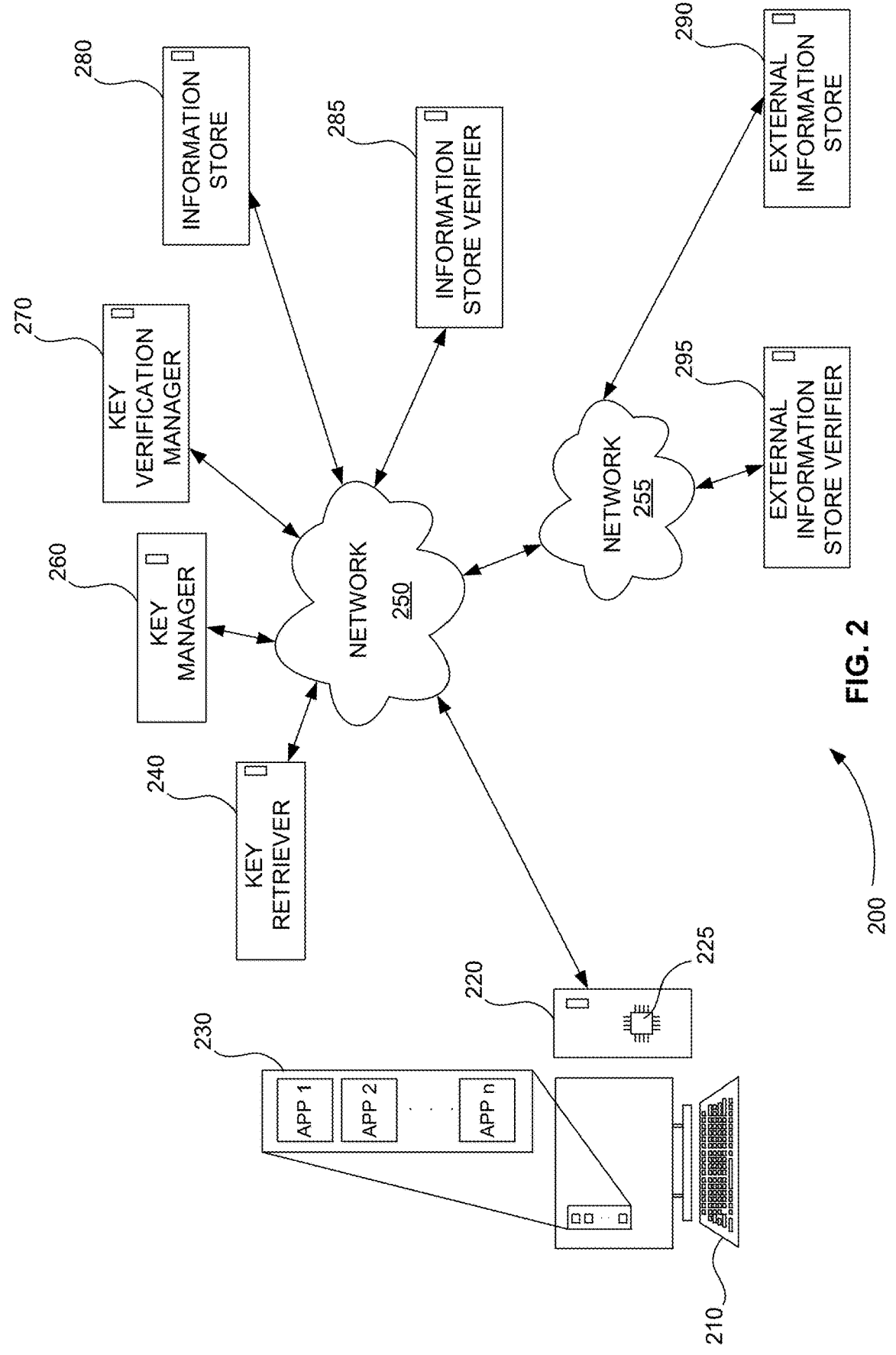

FIG. 2 is an exemplary system for establishing the validity of retrieved PQC public keys, in accordance with various embodiments.

Figure 3:
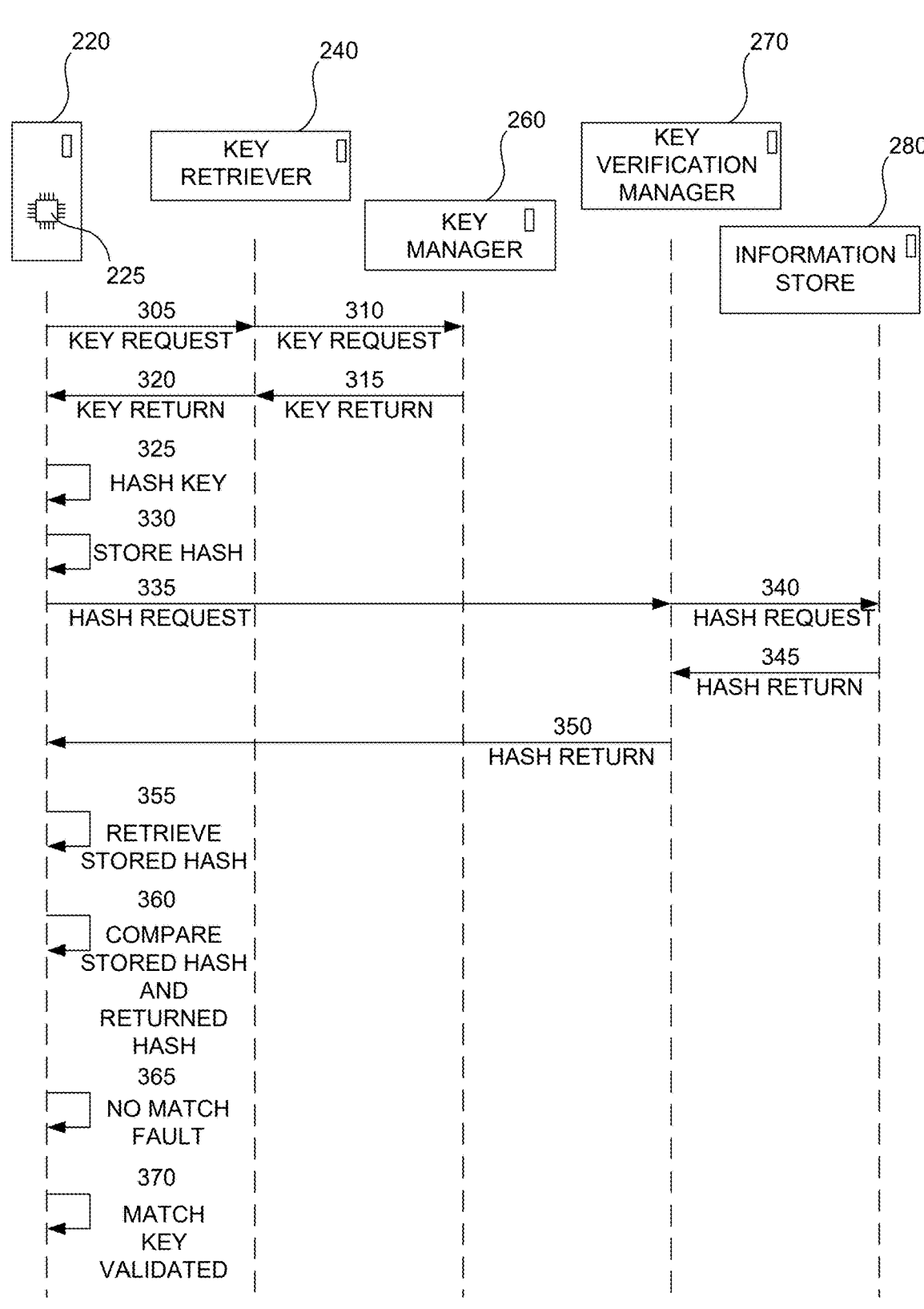

FIG. 3 is an exemplary sequence diagram showing the information flow for establishing the validity of retrieved PQC public keys, in accordance with various embodiments.

Figure 4:
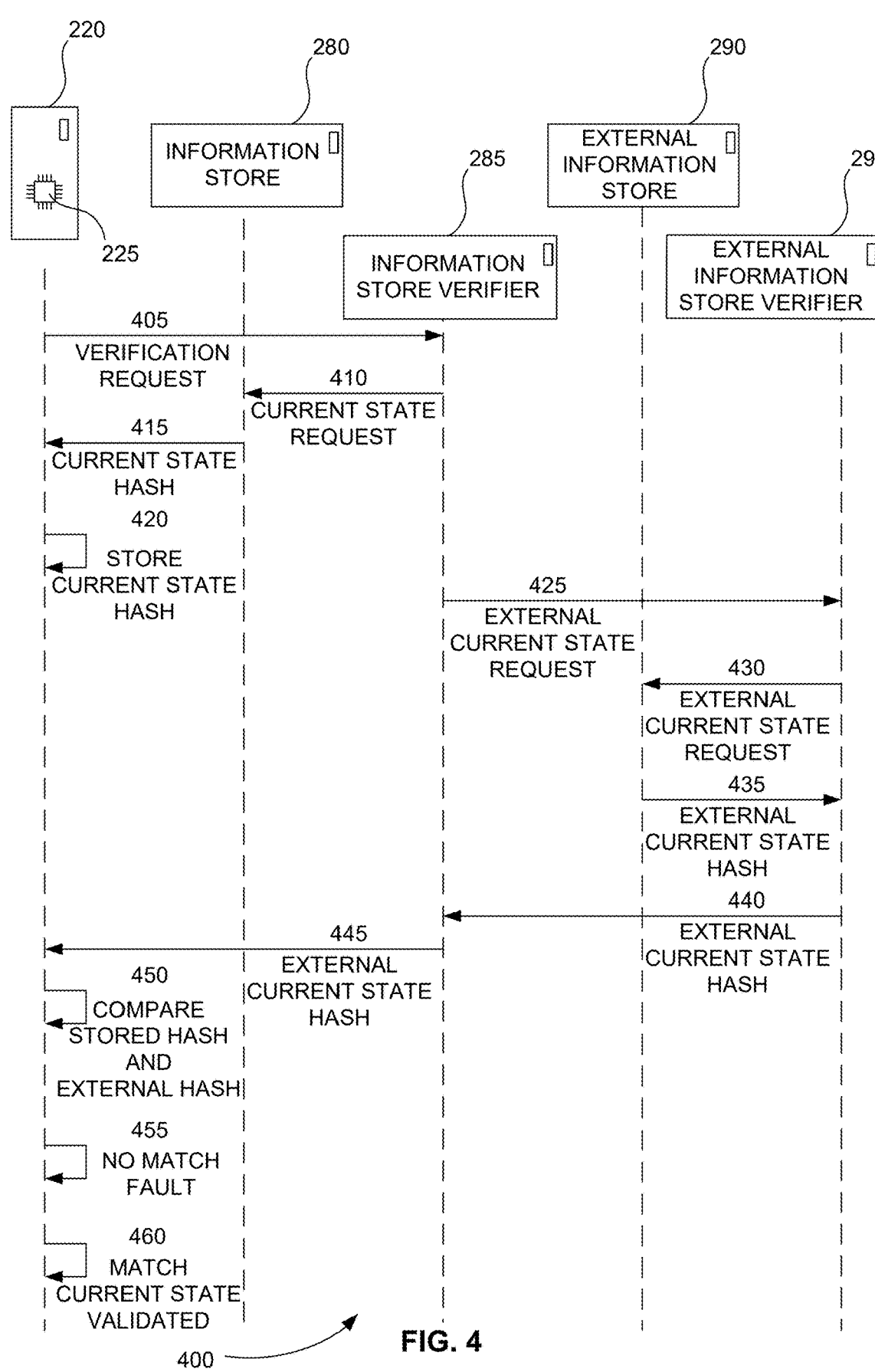

FIG. 4 is an exemplary sequence diagram showing the information flow for establishing the validity of the decentralized immutable information store, in accordance with various embodiments.

FIG. 5 is an exemplary flowchart showing a method for validating a public key, in accordance with various embodiments.

Figure 6:
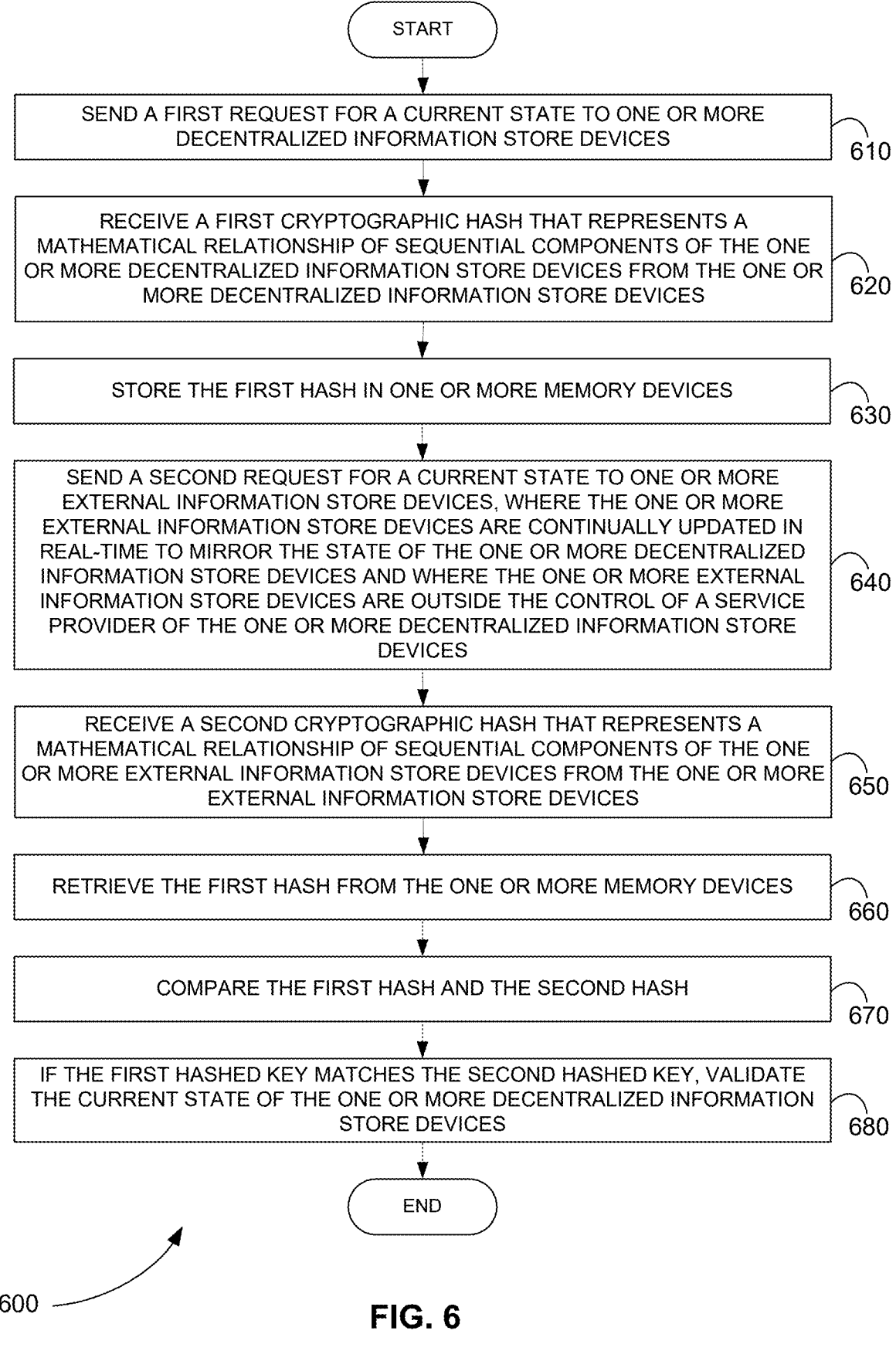

FIG. 6 is an exemplary flowchart showing a method for validating an information store, in accordance with various embodiments.

Figure 7:
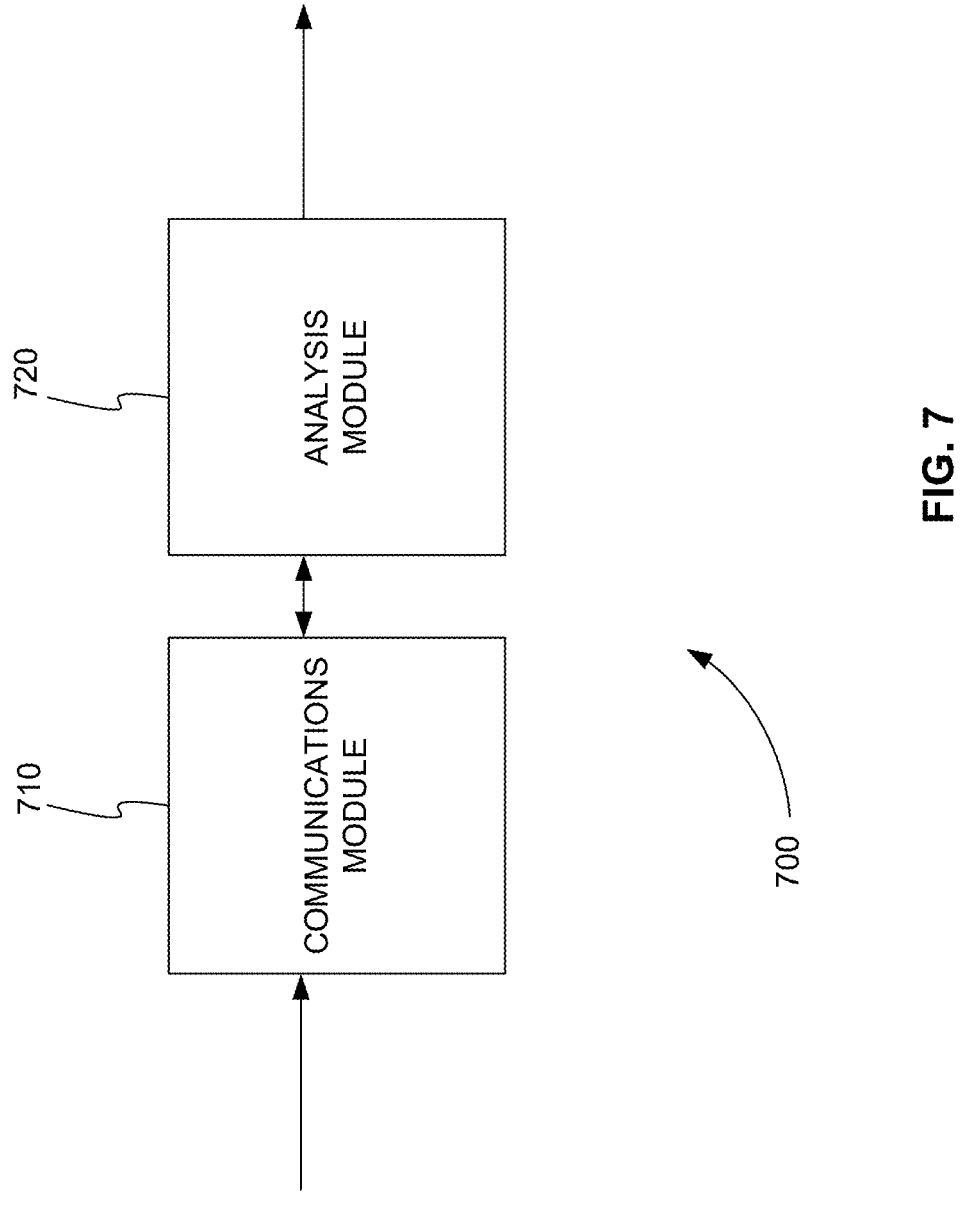

FIG. 7 is a schematic diagram of a system that includes one or more distinct software modules that perform a method for validating a public key or a method for validating an information store, in accordance with various embodiments.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

Figure 1:
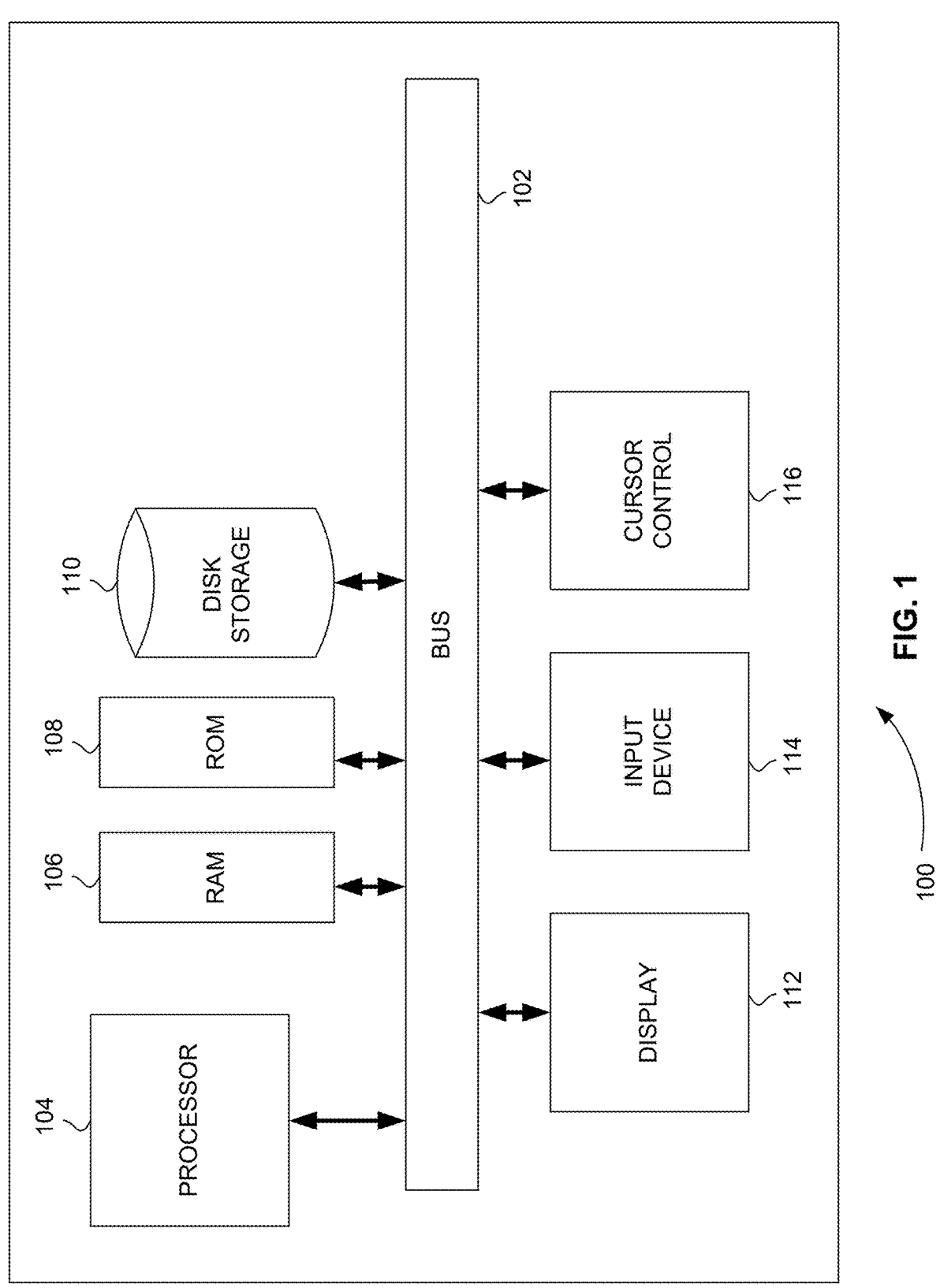
FIG. 1 is a block diagram that illustrates a computer system, upon which embodiments of the present teachings may be implemented.

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random-access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein.

Alternatively, hard-wired circuitry may be used in place of or in combination with software instructions to implement the present teachings. For example, the present teachings may also be implemented with programmable artificial intelligence (AI) chips with only the encoder neural network programmed—to allow for performance and decreased cost. Thus, implementations of the present teachings are not limited to any specific combination of hardware circuitry and software.

The term "computer-readable medium" or "computer program product" as used herein refers to any media that participates in providing instructions to processor 104 for execution. The terms "computer-readable medium" and "computer program product" are used interchangeably throughout this written description. Such a medium may take many forms, including but not limited to, non-volatile media and volatile media. Non-volatile media includes, for example, optical or magnetic disks, such as storage device 110. Volatile media includes dynamic memory, such as memory 106.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

Although computer system 100 is shown as a single processor in FIG. 1, in various embodiments computer system 100 can also include two or more processors. As a result, computer system 100 can be one or more processors. These one or more processors can be in the form of a cloud computing data center. These one or more processors can also include, but are not limited to, one or more central processing units (CPUs), one or more graphics processing units (GPUs), one or more neural network processing units (NPUs), or one or more tensor processing units (TPUs). In other words, one or more processors 104 can include any combination of CPUs, GPUs, NPUs, and TPUs.

In accordance with various embodiments, instructions configured to be executed by a processor to perform a method are stored on a computer-readable medium. The computer-readable medium can be a device that stores digital information. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Validate Keys and Information Stores

As described above, post-quantum cryptography (PQC) is currently limited, at least, by the inability of current Public Key Infrastructure (PKI) certificate management mechanisms to respond effectively to the threat posed by quantum computing, the vulnerability of existing, centralized certificate authorities (CAs) to sophisticated cyber-attacks, and the vulnerability of immutable information management systems such as distributed ledgers to sophisticated cyber-attacks. In other words, current PKI certificate management standards have not been updated to reflect the requirements of PQC key management, and in any case, updating the standards does not imply that the other security or architectural limitations have or can be addressed.

Quantum computing, however, presents at least two problems for certificate management systems. First, these systems use quantum-vulnerable digital signature and classical asymmetric cryptographic algorithms. Quantum computers are capable of running algorithms that can efficiently factor large numbers and solve discrete logarithm problems, breaking widely used public key encryption schemes such as Rivest-Shamir-Adleman (RSA) and elliptic-curve cryptography (ECC) that rely on these mathematical challenges. Current PKI certificate management systems are not able to respond to this threat because they are built around these vulnerable algorithms, embedding them in digital certificates and trust chains that secure internet communications. Compounding the problem are ongoing Harvest Now, Decrypt Later attacks, which cannot be effectively mitigated without a combination of PQC and post-quantum network security protocols, including certificate management mechanisms.

A second problem for certificate management systems provided by quantum computing involves the lack of standardization. There is no standardized, widely adopted digital certificate mechanism suitable for handling PQC keys, which are nontrivially larger than classical asymmetric cryptographic keys, nor is there one that is readily adaptable to the use of different PQC algorithms in the future.

The vulnerabilities inherent to centralized CAs have led to interest in the use of decentralized immutable information stores, such as distributed ledger technology, as a means to ensure the integrity and authenticity of public cryptographic keys. Unfortunately, decentralized immutable information stores come with their own risks.

As a result, there is an unmet need for systems and methods that solve both the PQC key integrity and authenticity problems as well as the trustworthiness and complexity issues associated with decentralized immutable information stores.

In various embodiments, an architecture that combines standardized PQC, decentralized immutable information stores, and an external verification capability enables the integrity and authenticity of both the public keys in question and the decentralized immutable information store itself to be verified on demand. This architecture mitigates or eliminates the risks associated with Harvest Now, Decrypt Later attacks, centralized CAs, and decentralized immutable information stores, enabling organizations to reap the security benefits of modern PQC without the delays inherent to the protocol development, standardization, and broad adoption processes. In addition, this architecture renders organizations agnostic to, immune to, or insulated from the expected periodic changes to PQC.

The advent of cryptanalytically relevant quantum computing, expected by the end of the decade, is anticipated to result in the widespread adoption of recently standardized PQC, including the Module-Lattice-Based Key-Encapsulation Mechanism (ML-KEM) algorithm, which has been standardized as FIPS 203. ML-KEM is effectively a public key encryption (PKE) algorithm used for key establishment during an online transaction. Unlike the legacy RSA algorithm, which identifies "public" and "private" keys that are mathematically related, ML-KEM uses what its specification refers to as "encapsulation" (encaps) and "decapsulation" (decaps) keys that are similarly mathematically related. For ease of reference, hereinafter, the encaps key is referred to as the public key and the decaps key is referred to as the private key.

One of the most significant challenges facing any public key encryption scheme is providing assurances to each sending party to a communication that the public key they are using to encrypt messages for the recipient party(s) does indeed belong to the intended recipient(s). Today, those assurances are provided by implementations for the X.509 and IETF RFC 5280 standards for Public Key Infrastructure (PKI) Certificates and Certificate Revocation Lists. However, those standards face a pair of significant challenges.

First, the differences in syntax and construction between legacy/classical public key material and PQC public (encaps) key material are significant enough that the current architecture cannot be used to provide assurances as to the validity and ownership of an ML-KEM encaps key.

Second, successful attacks against root Certificate Authorities (CAs), the trusted entities that issue digital certificates to verify the identity of websites, devices, or users in secure communications and act as the foundation for PKI have the potential to result in harm ranging from significant to catastrophic. In addition, these attacks are independent of and compounding to any issues created by quantum computing. Potential bad outcomes include, but are not limited to, widespread man-in-the-middle (MITM) attacks, erosion of trust in the ability to conduct secure online transactions, disruption of critical infrastructure, malware distribution and evasion, and global internet disruption.

While it is anticipated that existing X.509/RFC 5280 mechanisms will eventually be updated to integrate PQC public keys, there is no established or predicted timeline for this update to be developed, standardized, and widely adopted.

The situation with respect to attacks against Certificate Authorities (CA) is worse. While improvements in CA cybersecurity can mitigate the likelihood of a successful attack, the centralized nature of a CA's relationship with applications and systems that consume its service means that the CA remains an inviting target and therefore the weakest link in the public key assurance chain.

Various embodiments mitigate the risks and challenges posed by the combination of the incompatibility of existing certificate management mechanisms with PQC public keys and the vulnerability of centralized CAs through a combination of immutable, mathematically guaranteed data integrity and decentralized architecture and implementation. To provide these capabilities, various embodiments comprise a number of subcomponents, including, but not limited to, key consumer, key retriever, key manager, key verification manager, decentralized immutable information store, decentralized immutable information store verifier, external immutable information store verifier, and external immutable information store verifier.

An external immutable information store verifier is, for example, the mechanism that generates the query to retrieve the current state of the customer's copy of the blockchain. The external immutable information store, is for example, the blockchain, as represented by a hash.

Note that, in various embodiments, there are two distinct, mutually exclusive spheres of operational control. Sphere of control 1, or $SoC_1$, is within the purview of a service provider. Sphere of control 2, or $SoC_2$, is within the purview of one of the service provider's customers. $SoC_1$ and $SoC_2$ are linked by one or more non-controlling information mechanisms such as Wide Area Networking (WAN) or the Internet. However, while information can be read or exchanged, there are no methods by which either $SoC_1$ or $SoC_2$ is able to create, modify, or delete information within the other.

This combination simultaneously enables automated management, verification, and integrity verification of PQC public key materials, mitigation of the cybersecurity risks associated with vulnerabilities inherent to centralized CAs, and mitigation of the cybersecurity risks associated with vendor-controlled immutable information stores.

The benefits of this public key resilience and integrity system include the ability to move directly to the use of PQC regardless of the state of current PKI certificate management standards (e.g., X.509) or the degree to which the updated standards have or have not been adopted, thus immediately mitigating the risk presented by ongoing Harvest Now, Decrypt Later attacks, the ability to avoid the risks associated with attacks on conventional centralized CAs, and the ability to mitigate the risks associated with attacks on both permissioned and permissionless immutable information store mechanisms.

Various embodiments provide a mechanism supporting increased integrity and resilience of public key management mechanisms with respect to Harvest Now, Decrypt Later attacks, systemic, advanced, and persistent attacks against conventional CAs, and systemic, advanced, and persistent attacks against immutable information store mechanisms such as distributed ledger systems.

Various embodiments include a method of using one or more decentralized immutable information stores to ensure the validity, integrity, and authenticity of one or more PQC public keys in a manner that supports general use with enterprise applications.

Various embodiments can include one or more processors capable of executing instruction sets, volatile memory storage medium such as random access memory (RAM), non-volatile memory such as flash memory or a magnetic hard disk drive (HDD), a display medium, such as a liquid crystal display screen, a data entry mechanism, such as a keyboard, a pointing and selection mechanism, such as a mouse, a networking and communications mechanism, a key retriever, a key manager, a key verification manager, a decentralized immutable information store, a decentralized immutable information store verifier, an external immutable information store verifier, and an external immutable information store.

Note that various embodiments can also include a key consumer, but the key consumer is any system or application that interfaces with various embodiments to ensure the integrity and authenticity of PQC public keys it uses.

Note also that there are a number of constituent operations that make use of various embodiments. These operations can include retrieval of the PQC public key in question, calculation of a fixed-length globally unique identifier associated with the PQC public key in question, retrieval of the fixed-length globally unique identifier associated with the PQC public key in question from the decentralized immutable information store, validation of the calculated fixed-length globally unique identifier against the fixed-length globally unique identifier retrieved from the decentralized immutable information store, retrieval of a fixed-length globally unique identifier representing the current state of the decentralized immutable information store, retrieval of a fixed-length globally unique identifier representing the current state of the external decentralized immutable information store, validation of the calculated fixed-length globally unique identifier representing the current state of the decentralized immutable information store against the fixed-length globally unique identifier retrieved from the external decentralized immutable information store, and assessment of the validity of the retrieved PQC public keys.

Each of these is described in the sequence below, but there are essentially two sequences of activity that comprise various embodiments: a) establishment of the validity of the retrieved PQC public key(s), and b) establishment of the validity of the decentralized immutable information store: Establishment of the Validity of the Retrieved PQC Public Key(s)

FIG. 2 is an exemplary system 200 for establishing the validity of retrieved PQC public keys, in accordance with various embodiments. A user employs (e) data entry mechanism 210 or a pointing or selection mechanism to access computing device 220 on which one or more information exchange applications 230 have been installed. For example, an information exchange application is software used for any enterprise business activity requiring the movement of information from the computing device to a remote computing device, the goal of such exchange being that the exchanged information can be saved in a local or remote storage location accessible by the remote computing device.

The user employs computing device 220 to instruct an information exchange application of one or more information exchange applications 230 to begin the information exchange process. In this process, the information exchange application employs computing device 220 to access key retriever 240 via networking and communications mechanism 250. Key retriever 240 is able, via networking and communications mechanism 250, to convey a request for one or more specific PQC public keys to key manager 260.

Key manager 260 serves as a storage and retrieval mechanism for all PQC public keys of which the system has cognizance. Upon receiving a request from key retriever 240, key manager 260 assesses the request, identifies the stored PQC public key(s) relevant to the PQC public key request being made, and returns that (those) PQC public key(s) to key retriever 240.

Key retriever 240, upon receiving the PQC public key(s) from key manager 260, relays the PQC public key(s) to the requesting information exchange application of one or more information exchange applications 230.

In various embodiments, the requesting information exchange application of one or more information exchange applications 230 uses a one-way function that takes the arbitrary input represented by the retrieved PQC public key(s) and produces a fixed-size output with properties of preimage resistance, second preimage resistance, and collision resistance that represents a digest (hash) of the retrieved PQC public key(s).

Preimage resistance, for example, is a fundamental security property of cryptographic hash functions, ensuring that given a hash output (e.g., SHA-256("hello")=some 256-bit value), it is computationally infeasible to find any input message (the preimage) that produces that exact hash based on the hash output. In other words, even if an attacker knows the hash value, they cannot efficiently reverse-engineer or guess the original data that created it. This one-way nature is what makes secure hashes like SHA-256, BLAKE3, or SHA-3 suitable for applications such as password storage (storing only the hash, not the password itself), blockchain block linking (where changing a transaction would require finding a new preimage that matches the existing hash), digital signatures, and Merkle trees, because it prevents attackers from reconstructing sensitive original inputs from their hashes alone.

Second preimage resistance is, for example, a key security property of cryptographic hash functions that ensures that, given any input message and its hash output, it is computationally infeasible to find a different message (a second preimage) that produces the exact same hash value. In other words, if you already know a valid message M1 that hashes to H, you cannot efficiently discover another message $M2 \neq M1$ such that hash(M2)=H. This property is crucial for the security of many blockchain and cryptographic applications—for example, it prevents an attacker from substituting a malicious transaction for a legitimate one in a block while keeping the block's hash (and thus the chain) unchanged, or from forging a different document that matches the hash of a signed contract, thereby preserving the integrity and non-repudiation guarantees provided by secure hashes like SHA-256 or SHA-3.

Collison resistance is, for example, a critical security property of cryptographic hash functions that makes it computationally infeasible to find any two different input messages ($M1 \neq M2$) that produce the same hash value (i.e., hash(M1)=hash(M2)). This is stronger than second preimage resistance because the attacker gets to choose both inputs freely rather than being given one fixed message. Strong collision resistance is essential for the security of many cryptographic constructions for example, it prevents an attacker from creating two different documents (such as a legitimate contract and a malicious one) that hash to the same value, which could allow them to forge signatures, substitute transactions in a blockchain while preserving the block hash, or break the integrity guarantees of digital certificates and Merkle trees. Modern secure hashes like SHA-256 and SHA-3 are designed to provide collision resistance, with finding a collision expected to require approximately $2^{\{n/2\}}$ work (where n is the hash output size in bits) under the birthday paradox.

The requesting information exchange application of one or more information exchange applications 230 temporarily stores the digest (hash) of the retrieved PQC public key(s) in volatile memory storage medium 225, such as random-access memory (RAM), of computing device 220.

The information exchange application of one or more information exchange applications 230 sends a request to key verification manager 270 for the canonical digest(s) (hash(es)) of the retrieved PQC public key(s).

Key verification manager 270 relays the request for the canonical digest(s) (hash(es)) of the retrieved PQC public key(s) to decentralized immutable information store 280.

Decentralized immutable information store 280 maintains canonical copies of all PQC public keys of which the system has cognizance. These are stored in a mathematically immutable manner such that any attempt at tampering or modification is evident. (Note: The implementation of (k) is distributed ledger technology, i.e., a blockchain.)

Upon receipt of the request for the canonical digest(s) (hash(es)) of the retrieved PQC public key(s), decentralized immutable information 280 store calculates and provides the relevant canonical digest(s) (hash(es)) to key verification manager 270.

Upon receipt of the canonical digest(s) (hash(es)) of the retrieved PQC public key(s) from decentralized immutable information store 280, the key verification manager 270 provides the canonical digest(s) (hash(es)) of the retrieved PQC public key(s) to the information exchange application of one or more information exchange applications 230.

Upon receipt of the canonical digest(s) (hash(es)) of the retrieved PQC public key(s) from key verification manager 270, the information exchange application of one or more information exchange applications 230 retrieves the calculated digest (hash) of the retrieved PQC public key(s) from the volatile memory storage medium 225, such as random-access memory (RAM).

Upon retrieval of the calculated digest (hash) of the retrieved PQC public key(s) from the (b) volatile memory storage medium 225, the information exchange application of one or more information exchange applications 230 compares the calculated digest (hash) of the retrieved PQC public key(s) to the canonical digest(s) (hash(es)) of the retrieved PQC public key(s).

If the calculated digest (hash) of the retrieved PQC public key(s) fails to match the canonical digest(s) (hash(es)) of the retrieved PQC public key(s), the information exchange application of one or more information exchange applications 230 declares a fault and ceases further activity.

If the calculated digest (hash) of the retrieved PQC public key(s) matches the canonical digest(s) (hash(es)) of the retrieved PQC public key(s), the information exchange application of one or more information exchange applications 230 validates the retrieved PQC public key(s) and proceeds to validate that the (k) decentralized immutable information store has not been modified or tampered with without authorization.

FIG. 3 is an exemplary sequence diagram 300 showing the information flow for establishing the validity of retrieved PQC public keys, in accordance with various embodiments.

In step 305, an information exchange application of one or more information exchange applications employs computing device 220 to access key retriever 240 to request one or more specific PQC public keys.

In step 310, key retriever 240 requests the one or more specific PQC public keys from key manager 260.

In step 315, key manager 260 returns (those) PQC public key(s) to key retriever 240.

In step 320, key retriever 240 returns the PQC public key(s) to the requesting information exchange application running on computing device 220.

In step 325, the requesting information exchange application running on computing device 220 uses a one-way function that takes the arbitrary input represented by the retrieved PQC public key(s) and produces a fixed-size output with properties of preimage resistance, second preimage resistance, and collision resistance that represents a digest (hash) of the retrieved PQC public key(s).

In step 330, the requesting information exchange application running on computing device 220 temporarily stores the digest (hash) of the retrieved PQC public key(s) in volatile memory storage medium 225 of computing device 220.

In step 335, the information exchange application running on computing device 220 sends a request to key verification manager 270 for the canonical digest(s) (hash(es)) of the retrieved PQC public key(s).

In step 340, key verification manager 270 relays the request for the canonical digest(s) (hash(es)) of the retrieved PQC public key(s) to decentralized immutable information store 280.

In step 345, upon receipt of the request for the canonical digest(s) (hash(es)) of the retrieved PQC public key(s), decentralized immutable information 280 store provides the relevant canonical digest(s) (hash(es)) to key verification manager 270.

In step 350, upon receipt of the canonical digest(s) (hash(es)) of the retrieved PQC public key(s) from decentralized immutable information store 280, the key verification manager 270 provides the canonical digest(s) (hash(es)) of the retrieved PQC public key(s) to the information exchange application running on computing device 220.

In step 355, upon receipt of the canonical digest(s) (hash(es)) of the retrieved PQC public key(s) from key verification manager 270, the information exchange application running on computing device 220 retrieves the calculated digest (hash) of the retrieved PQC public key(s) from the volatile memory storage medium 225.

In step 360, upon retrieval of the calculated digest (hash) of the retrieved PQC public key(s) from the (b) volatile memory storage medium 225, the information exchange application running on computing device 220 compares the calculated digest (hash) of the retrieved PQC public key(s) to the canonical digest(s) (hash(es)) of the retrieved PQC public key(s).

In step 365, if the calculated digest (hash) of the retrieved PQC public key(s) fails to match the canonical digest(s) (hash(es)) of the retrieved PQC public key(s), the information exchange application running on computing device 220 declares a fault and ceases further activity.

In step 370, if the calculated digest (hash) of the retrieved PQC public key(s) matches the canonical digest(s) (hash(es)) of the retrieved PQC public key(s), the information exchange application running on computing device 220 validates the retrieved PQC public key(s) and proceeds to validate that the (k) decentralized immutable information store has not been modified or tampered with without authorization.

Establishment of the Validity of the Decentralized Immutable Information Store

Returning to FIG. 2, the system of FIG. 2 further includes decentralized immutable information store verifier 285, external network 255, external immutable information store 290, and external immutable information store verifier 295 to validate external immutable information store 290. In various embodiments, external network 255 is a network separate from network 250. External immutable information store 290 and external immutable information store verifier 295 are specifically located on external network 255, which is separate from network 250. Network 250 and external network 255 are linked by one or more non-controlling information mechanisms such as Wide Area Networking (WAN) or the Internet. This separation between networks enhances the security of external immutable information store 290 and external immutable information store verifier 295.

FIG. 4 is an exemplary sequence diagram 400 showing the information flow for establishing the validity of the decentralized immutable information store, in accordance with various embodiments.

In step 405, an information exchange application of one or more information exchange applications running on computing device 220 sends a request to decentralized immutable information store verifier 285 to initiate verification of decentralized immutable information store 280.

In step 410, decentralized immutable information store verifier 285 initiates retrieval of the current state of decentralized immutable information store 280.

In step 415, decentralized immutable information store 280 provides its current state, which may be in the form of a fixed-size output with properties of preimage resistance, second preimage resistance, and collision resistance that represents a digest (hash) of the mathematical relationship of all sequential components of the decentralized immutable information store 280 as of the moment its state was requested, to the information exchange application running on computing device 220.

In step 420, the information exchange application running on computing device 220 maintains or stores the current state of decentralized immutable information store 280 in volatile memory storage medium 225 of computing device 220.

In step 425, decentralized immutable information store verifier 285 initiates the retrieval of the current state of external immutable information store 295 by requesting the current state of external immutable information store 290 from external immutable information store verifier 295.

External immutable information store 290 and external immutable information store verifier 295 are situated outside of the control boundaries of the service provider ($SoC_1$), and are wholly under the control of the service provider customer ($SoC_2$) for as long as the service provider customer remains a customer of the service provider. External immutable information store 290 is continually updated in real time to mirror the state of decentralized immutable information store 280.

In step 430, external immutable information store verifier 295 initiates retrieval of the current state of external immutable information store 290, which may be in the form of a fixed-size output with properties of preimage resistance, second preimage resistance, and collision resistance that represents a digest (hash) of the mathematical relationship of all sequential components of external immutable information store 290.

In step 435, external immutable information store 290 provides its current state to the external immutable information store verifier 295, which may be in the form of a fixed-size output with properties of preimage resistance, second preimage resistance, and collision resistance that represents a digest (hash) of the mathematical relationship of all sequential components of external decentralized immutable information store 290.

In step 440, external immutable information store verifier 295 provides the current state of external immutable information store 290 to decentralized immutable information store verifier 285.

In step 445, decentralized immutable information store verifier 285 provides the current state of external immutable information store 290 to the information exchange application running on computing device 220.

In step 450, the information exchange application running on computing device 220 compares the state of decentralized immutable information store 280 in volatile memory storage medium 225 to the retrieved state of external immutable information store 290.

In step 455, if the state of decentralized immutable information store 280 fails to match the state retrieved from external immutable information store 290, the information exchange application running on computing device 220 declares a fault and ceases further activity.

In step 460, if the state of decentralized immutable information store 280 matches the state retrieved from external immutable information store 290, the information exchange application running on computing device 220 validates that decentralized immutable information store 280 has not been modified or tampered with without authorization and permits use of the retrieved PQC key(s) described above to move forward.

Operational Implementation

Returning to FIG. 2, once both the retrieved PQC key(s) and decentralized immutable information store 280 have been validated, the retrieved PQC key(s) are deemed valid and fit for use in the instant cryptographic operation.

During operations, an external consumer, such as an information exchange application of one or more information exchange applications 230, initiates PQC key validation by querying key retriever 240. Upon receiving a request for the PQC key(s), key manager 260 provides the current copy(ies) of the key(s) to the external consumer using computing device 220, which generates local hashes of the retrieved PQC key(s).

The external consumer then requests canonical copies of the PQC key(s) from key verification manager 270, which obtains them from decentralized immutable information store 280 and returns them to the external consumer using computing device 220.

The external consumer, using computing device 220, hashes the canonical copies of the PQC key(s) and compares the hashes to the locally held hashes of the retrieved PQC key(s). If the hashes match, the keys are considered valid as the canonical copies were held on and retrieved from an immutable source of information.

If the PQC key(s) are valid, what remains is to ensure that the (k) immutable information store is valid; i.e., that it hasn't been replaced wholesale. This is done by comparing a hash of the state of decentralized immutable information store 280 state against a hash of a synchronized copy of the state of decentralized immutable information store 280 (i.e., the state of external immutable information store 290) that is outside the control of the service provider.

If the hash of the state of the service provider's copy of decentralized immutable information store 280 and the hash of the state of external immutable information store 290 match, decentralized immutable information store 280, and by extension, the canonical key material stored on it, are considered valid as the service provider cannot modify or suborn external immutable information store 290.

Various embodiments therefore create post-quantum cryptographic key material resilience and integrity with respect to PKI, man-in-the-middle, identity spoofing, impersonation, and other similar attacks that leverage the use of illegitimate public key material, in both the absence of a post-quantum mechanism equivalent to that provided by the X.509 standard and the vulnerabilities represented by the centralization of authority in conventional CAs. In conventional centralized CA architectures, attackers need only successfully attack a single point (i.e., the CA) for key material to be rendered untrustworthy to all entities using that CA. In the decentralized model embodied in various embodiments, the attacker has to successfully a) identify all the decentralized immutable information store channels associated with a particular customer's key management activities, b) successfully attack all those channels, c) identify the local copy(ies) of the immutable information store kept by the customer, and d) successfully attack those local copies. If the attack fails against a single channel, it has failed in its entirety. This creates a state of strong resilience in terms of both key material integrity and the attacks noted above.

By forcing attackers to proceed against all channels concurrently, various embodiments drive the cost of the attack upward asymptotically while concomitantly reducing the return on investment. As a result, various embodiments create a state of economic attack deterrence, which contributes to the overall resilience improvement.

System for Validating a Public Key

Returning to FIG. 2, this figure depicts a system for validating a public key, in accordance with various embodiments. In FIG. 2, the system includes one or more memory devices 225 and one or more processors 220.

One or more memory devices 225 are shown in FIG. 2 as a single memory device but can be any configuration of one or more memory devices. Similarly, one or more processors 220 are shown in FIG. 2 as a single desktop computer but can be any configuration of one or more processors including, but not limited to, the configurations described for computing system of FIG. 1.

One or more processors 220 send a first request for a public key to one or more key manager devices 260. One or more processors 220 receive the public key from one or more key manager devices 260. One or more processors 220 apply a cryptographic hash algorithm to the public key, producing a first hashed key. One or more processors 220 store the first hashed key in one or more memory devices 225. One or more processors 220 send a second request for a cryptographic hash of the public key to one or more decentralized information store devices 280. One or more processors 220 receive a second hashed key from one or more decentralized information store devices 280. One or more processors 220 retrieve the first hashed key from one or more memory devices 225. One or more processors 220 compare the first hashed key and the second hashed key. Finally, if the first hashed key matches the second hashed key, one or more processors 220 validate the first hashed key.

In various embodiments, validating the first hashed key can include, for example, marking the first hashed key stored in one or more memory devices 225 as valid by storing additional information with the first hashed key in one or more memory devices 225.

In various embodiments, if the first hashed key does not match the second hashed key, one or more processors 220 do not validate the first hashed key. Not validating the first hashed key can include, but is not limited to, warning a user of the inability to validate, marking the first hashed key stored in one or more memory devices 225 as invalid by storing additional information with the first hashed key in one or more memory devices 225, or removing the first hashed key stored in one or more memory devices 225.

In various embodiments, one or more processors 220 send the first request for the public key to one or more key manager devices 260 by first sending a request for the public key to one or more key retriever devices 240 that, in turn, send a request for the public key to one or more key manager devices 260. Similarly, one or more processors 220 receive the public key from one or more key manager devices 260 by receiving the public key from one or more key retriever devices 240 that have received the public key from one or more key manager devices 260.

In various embodiments, one or more memory devices 225 include at least one volatile memory device.

In various embodiments, one or more processors 220 send the second request for the cryptographic hash of the public key to one or more decentralized information store devices 280 by first sending a request for the cryptographic hash of the public key to one or more key verification devices 270 that, in turn, send a request for a cryptographic hash of the public key to one or more decentralized information store devices 280. Similarly, one or more processors 220 receive the second hashed key from one or more decentralized information store devices 280 by receiving the second hashed key from one or more key verification devices 270 that have received the second hashed key from one or more decentralized information store devices 280.

In various embodiments, one or more processors 220 apply a cryptographic hash algorithm to the public key, comprising applying a mathematical algorithm to the public key that produces a fixed-size output with properties of preimage resistance, second preimage resistance, or collision resistance that represents a hash of the public key.

In various embodiments, one or more decentralized information store devices 280 each include immutable data in a blockchain that cannot be modified or deleted without evidence of the modification or deletion where decentralization is implemented via a peer-to-peer network in which many distributed nodes each hold a full copy of the transaction ledger, independently verify new transactions, and participate in the consensus mechanism to agree on the canonical chain.

In various embodiments, one or more processors 220, one or more key retriever devices 240, one or more key manager devices 260, one or more key verification devices 270, and one or more decentralized information store devices 280 are in communication via one or more networks 250.

In FIG. 2, one or more key retriever devices 240, one or more key manager devices 260, one or more key verification devices 270, and one or more decentralized information store devices 280 are each shown as a single server computer, but can be any configuration of one or more processors including, but not limited to, the computing system of FIG. 1.

Method for Validating a Public Key

FIG. 5 is an exemplary flowchart 500 showing a method for validating a public key, in accordance with various embodiments.

In step 510 of method 500, a first request for a public key is sent to one or more key manager devices.

In step 520, the public key is received from the one or more key manager devices.

In step 530, a cryptographic hash algorithm is applied to the public key, producing a first hashed key.

In step 540, the first hashed key is stored in one or more memory devices.

In step 550, a second request for a cryptographic hash of the public key is sent to one or more decentralized information store devices.

In step 560, a second hashed key is received from the one or more decentralized information store devices.

In step 570, the first hashed key is retrieved from the one or more memory devices.

In step 580, the first hashed key and the second hashed key are compared.

In step 590, if the first hashed key matches the second hashed key, the first hashed key is validated.

Computer Program Product for Validating a Public Key

In various embodiments, computer program products include a tangible computer-readable storage medium whose contents include a program with instructions being executed on a processor so as to perform a method for validating a public key. This method is performed by a system that includes one or more distinct software modules.

FIG. 7 is a schematic diagram of a system 700 that includes one or more distinct software modules that perform a method for validating a public key, in accordance with various embodiments. System 700 includes a communications module 710 and an analysis module 720.

Communications module 710 sends a first request for a public key to one or more key manager devices. Communications module 710 receives the public key from the one or more key manager devices.

Analysis module 720 applies a cryptographic hash algorithm to the public key, producing a first hashed key.

Communications module 710 stores the first hashed key in one or more memory devices. Communications module 710 sends a second request for a cryptographic hash of the public key to one or more decentralized information store devices. Communications module 710 receives a second hashed key from the one or more decentralized information store devices. Communications module 710 retrieves the first hashed key from the one or more memory devices.

Analysis module 720 compares the first hashed key and the second hashed key. If the first hashed key matches the second hashed key, analysis module 720 validates the first hashed key.

System for Validating an Information Store

Returning to FIG. 2, this figure also depicts a system for validating an information store, in accordance with various embodiments. In FIG. 2, the system includes one or more memory devices 225 and one or more processors 220.

One or more processors 220 send a first request for a current state to one or more decentralized information store devices 280. One or more processors 220 receive a first cryptographic hash that represents a mathematical relationship of sequential components of one or more decentralized information store devices 280 from one or more decentralized information store devices 280. One or more processors 220 store the first hash in one or more memory devices 225. One or more processors 220 send a second request for a current state to one or more external information store devices 290. One or more external information store devices 290 are continually updated in real-time to mirror the state of one or more decentralized information store devices 280, and one or more external information store devices 290 are outside the control of a service provider of one or more decentralized information store devices. One or more processors 220 receive a second cryptographic hash that represents a mathematical relationship of sequential components of one or more external information store devices 290 from one or more external information store devices 290. One or more processors 220 retrieve the first hash from one or more memory devices 225. One or more processors 220 compare the first hash and the second hash. Finally, if the first hash matches the second hash key, one or more processors 220 validate the current state of one or more decentralized information store devices 280.

In various embodiments, validating the current state of one or more decentralized information store devices 280, for example, marking the first hash stored in one or more memory devices 225 as valid by storing additional information with the first hash in one or more memory devices 225.

In various embodiments, if the first hash does not match the second hashed key, one or more processors 220 do not validate the current state of one or more decentralized information store devices 280. Not validating the current state of one or more decentralized information store devices 280 can include, but is not limited to, warning a user of the inability to validate, marking the first hash stored in one or more memory devices 225 as invalid by storing additional information with the first hashed key in one or more memory devices 225, or removing the first hash stored in one or more memory devices 225.

In various embodiments, one or more processors 220 send the first request for the current state to one or more decentralized information store devices 280 by first sending a request for the current state to one or more information store verifier devices 285 that, in turn, send a request for the current state to one or more decentralized information store devices 280. Similarly, one or more processors 220 receive the first cryptographic hash from one or more decentralized information store devices 280 by receiving the first hash from one or more information store verifier devices 285 that have received the first hash from one or more decentralized information store devices 280.

In various embodiments, one or more memory devices 225 include at least one volatile memory device.

In various embodiments, one or more processors 220 send the second request for a current state to one or more external information store devices 290 by first sending a request for the current state to one or more external information store verifier devices 295 that, in turn, send a request for the current state to the one or more external information store devices. One or more external information store verifier devices 295 are outside the control of the service provider of the one or more decentralized information store devices 280. Similarly, one or more processors 220 receive the second hash from one or more external information store devices 290 by receiving the second hashed key from one or more external information store verifier devices 295 that have received the second hashed key from one or more external information store devices 290.

In various embodiments, the first hash and the second hash each include a fixed-size output with properties of preimage resistance, second preimage resistance, or collision resistance.

In various embodiments, one or more external information store devices 290 each include immutable data in a blockchain that cannot be modified or deleted without evidence of the modification or deletion where decentralization is implemented via a peer-to-peer network in which many distributed nodes each hold a full copy of the transaction ledger, independently verify new transactions, and participate in the consensus mechanism to agree on the canonical chain.

In various embodiments, one or more processors 220, one or more information store verifier devices 285, and one or more decentralized information store devices 280 are in communication via one or more networks 250. One or more external information store verifier devices 295, and one or more external information store devices 290 are in communication via one or more networks 255. One or more networks 250 and one or more external networks 255 are linked by one or more non-controlling information mechanisms such as Wide Area Networking (WAN) or the Internet (not shown).

In FIG. 2, one or more information store verifier devices 285, one or more decentralized information store devices 280, one or more external information store verifier devices 295, and one or more external information store devices 290 are each shown a single server computer but can be any configuration of one or more processors including, but not limited to, the computing system of FIG. 1.

Method for Validating an Information Store

FIG. 6 is an exemplary flowchart 600 showing a method for validating an information store, in accordance with various embodiments.

In step 610 of method 600, a first request for a current state is sent to one or more decentralized information store devices.

In step 620, a first cryptographic hash that represents a mathematical relationship of sequential components of the one or more decentralized information store devices is received from the one or more decentralized information store devices.

In step 630, the first hash is stored in one or more memory devices.

In step 640, a second request for a current state is sent to one or more external information store devices. The one or more external information store devices are continually updated in real-time to mirror the state of the one or more decentralized information store devices. The one or more external information store devices are outside the control of a service provider of the one or more decentralized information store devices.

In step 650, a second cryptographic hash that represents a mathematical relationship of sequential components of the one or more external information store devices is received from the one or more external information store devices.

In step 660, the first hash is retrieved from the one or more memory devices.

In step 670, the first hash and the second hash are compared.

In step 680, if the first hash matches the second hash, the current state of the one or more decentralized information store devices is validated.

Computer Program Product for Validating an Information Store

In various embodiments, computer program products include a tangible computer-readable storage medium whose contents include a program with instructions being executed on a processor so as to perform a method for validating an information store. This method is performed by a system that includes one or more distinct software modules.

FIG. 7 is also a schematic diagram of a system 700 that includes one or more distinct software modules that perform a method for validating an information store, in accordance with various embodiments. System 700 includes a communications module 710 and an analysis module 720.

Communications module 710 sends a first request for a current state to one or more decentralized information store devices. Communications module 710 receives a first cryptographic hash that represents a mathematical relationship of sequential components of the one or more decentralized information store devices from the one or more decentralized information store devices. Communications module 710 stores the first hash key in one or more memory devices.

Communications module 710 sends a second request for a current state to one or more external information store devices. The one or more external information store devices are continually updated in real-time to mirror the state of the one or more decentralized information store devices. The one or more external information store devices are outside the control of a service provider of the one or more decentralized information store devices. Communications module 710 receives a second cryptographic hash that represents a mathematical relationship of sequential components of the one or more external information store devices from the one or more external information store devices. Communications module 710 retrieves the first hash key from the one or more memory devices.

Analysis module 720 compares the first hash and the second hash. If the first hash matches the second hash, analysis module 720 validates the current state of the one or more decentralized information store devices.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for validating a public key, comprising:
   one or more memory devices; and
   one or more processors in communication with the one or more memory devices wherein the one or more processors
   send a first request for the public key to one or more key manager devices,
   receive the public key from the one or more key manager devices,
   apply a cryptographic hash algorithm to the public key, producing a first hashed key,
   store the first hashed key in the one or more memory devices,
   send a second request for a cryptographic hash of the public key to one or more decentralized information store devices,
   receive a second hashed key from the one or more decentralized information store devices,
   retrieve the first hashed key from the one or more memory devices,
   compare the first hashed key and the second hashed key, and
   if the first hashed key matches the second hashed key, validate the first hashed key.

2. The system of claim 1, wherein if the first hashed key does not match the second hashed key, the one or more processors do not validate the first hashed key.

3. The system of claim 1, wherein the one or more processors send the first request for the public key to the one or more key manager devices by sending a request for the public key to one or more key retriever devices that, in turn, send a request for the public key to the one or more key manager devices, and receive the public key from the one or more key manager devices by receiving the public key from the one or more key retriever devices that have received the public key from the one or more key manager devices.

4. The system of claim 1, wherein the one or more memory devices comprise at least one volatile memory device.

5. The system of claim 1, wherein the one or more processors send the second request for the cryptographic hash of the public key to the one or more decentralized information store devices by sending a request for the cryptographic hash of the public key to one or more key verification devices that, in turn, send a request for the cryptographic hash of the public key to the one or more decentralized information store devices, and receive the second hashed key from the one or more decentralized information store devices by receiving the second hashed key from the one or more key verification devices that have received the second hashed key from the one or more decentralized information store devices.

6. The system of claim 1, wherein the one or more processors apply a cryptographic hash algorithm to the public key comprising applying a mathematical algorithm to the public key that produces a fixed-size output with properties of preimage resistance, second preimage resistance, or collision resistance that represents a hash of the public key.

7. The system of claim 1, wherein the one or more decentralized information store devices each include immutable data in a blockchain that cannot be modified or deleted without evidence of the modification or deletion where decentralization is implemented via a peer-to-peer network in which many distributed nodes each hold a full copy of the transaction ledger, independently verify new transactions, and participate in the consensus mechanism to agree on the canonical chain.

8. A method for validating a public key, comprising:

sending a first request for the public key to one or more key manager devices;

receiving the public key from the one or more key manager devices;

applying a cryptographic hash algorithm to the public key, producing a first hashed key;

storing the first hashed key in one or more memory devices;

sending a second request for a cryptographic hash of the public key to one or more decentralized information store devices;

receiving a second hashed key from the one or more decentralized information store devices;

retrieving the first hashed key from the one or more memory devices;

comparing the first hashed key and the second hashed key; and if the first hashed key matches the second hashed key, validating the first hashed key.

9. The method of claim 8, wherein if the first hashed key does not match the second hashed key, the first hashed key is not validated.

10. The method of claim 8, wherein sending the first request for a public key to the one or more key manager devices comprises sending a request for a public key to one or more key retriever devices that, in turn, send a request for the public key to the one or more key manager devices and receiving the public key from the one or more key manager devices comprises receiving the public key from the one or more key retriever devices that have received the public key from the one or more key manager devices.

11. The method of claim 8, wherein the one or more memory devices comprise at least one volatile memory device.

12. The method of claim 8, wherein sending the second request for the cryptographic hash of the public key to the one or more decentralized information store devices comprises sending a request for the cryptographic hash of the public key to one or more key verification devices that, in turn, send a request for the cryptographic hash of the public key to the one or more decentralized information store devices; and receiving the second hashed key from the one or more decentralized information store devices comprises receiving the second hashed key from the one or more key verification devices that have received the second hashed key from the one or more decentralized information store devices.

13. The method of claim 8, wherein applying the cryptographic hash algorithm to the public key comprises applying a mathematical algorithm to the public key that produces a fixed-size output with properties of preimage resistance, second preimage resistance, or collision resistance that represents a hash of the public key.

14. The method of claim 8, wherein the one or more decentralized information store devices each include immutable data in a blockchain that cannot be modified or deleted without evidence of the modification or deletion where decentralization is implemented via a peer-to-peer network in which many distributed nodes each hold a full copy of the transaction ledger, independently verify new transactions, and participate in the consensus mechanism to agree on the canonical chain.

15. A computer program product, comprising a non-transitory tangible computer-readable storage medium whose contents cause a processor to perform a method for validating a public key, comprising:

providing a system, wherein the system comprises one or more distinct software modules, and wherein the distinct software modules comprise a communications module and an analysis module;

sending a first request for the public key to one or more key manager devices using the communications module;

receiving the public key from the one or more key manager devices using the communications module;

applying a cryptographic hash algorithm to the public key, producing a first hashed key using the analysis module;

storing the first hashed key in one or more memory devices using the communications module;

sending a second request for a cryptographic hash of the public key to one or more decentralized information store devices using the communications module;

receiving a second hashed key from the one or more decentralized information store devices using the communications module;

retrieving the first hashed key from the one or more memory devices using the communications module;

comparing the first hashed key and the second hashed key using the analysis module; and if the first hashed key matches the second hashed key, validating the first hashed key using the analysis module.

16. The computer program product of claim 15, wherein if the first hashed key does not match the second hashed key, the first hashed key is not validated.

17. The computer program product of claim 15, wherein sending the first request for the public key to the one or more key manager devices comprises sending a request for a public key to one or more key retriever devices that, in turn, send the request for the public key to the one or more key manager devices; and receiving the public key from the one or more key manager devices comprises receiving the public key from the one or more key retriever devices that have received the public key from the one or more key manager devices.

18. The computer program product of claim 15, wherein the one or more memory devices comprises at least one volatile memory device.

19. The computer program product of claim 15, wherein sending the second request for the cryptographic hash of the public key to the one or more decentralized information store devices comprises sending a request for the cryptographic hash of the public key to one or more key verification devices that, in turn, send a request for the cryptographic hash of the public key to the one or more decentralized information store devices; and receiving the second hashed key from the one or more decentralized information store devices comprises receiving the second hashed key from the one or more key verification devices that have received the second hashed key from the one or more decentralized information store devices.

20. The computer program product of claim 15, wherein applying the cryptographic hash algorithm to the public key comprises applying a mathematical algorithm to the public key that produces a fixed-size output with properties of preimage resistance, second preimage resistance, or collision resistance that represents a hash of the public key.

\*   \*   \*   \*   \*